US010232528B2

(12) United States Patent
Boon et al.

(10) Patent No.: US 10,232,528 B2
(45) Date of Patent: Mar. 19, 2019

(54) WIND TURBINE BLADES

(71) Applicant: Vestas Wind Systems A/S, Aarhus N. (DK)

(72) Inventors: Christopher Boon, Hampshire (GB); John Pedersen, Aarhus N. (DK)

(73) Assignee: Vestas Wind Systems A/S, Aarhus N. (DK)

( * ) Notice: Subject to any disclaimer, the term of this patent is extended or adjusted under 35 U.S.C. 154(b) by 335 days.

(21) Appl. No.: 15/035,932

(22) PCT Filed: Nov. 10, 2014

(86) PCT No.: PCT/DK2014/050373
§ 371 (c)(1),
(2) Date: May 11, 2016

(87) PCT Pub. No.: WO2015/067279
PCT Pub. Date: May 14, 2015

(65) Prior Publication Data
US 2016/0263775 A1 Sep. 15, 2016

(30) Foreign Application Priority Data
Nov. 11, 2013 (GB) .................................. 1319848.6

(51) Int. Cl.
B24B 7/30 (2006.01)
F03D 1/06 (2006.01)
(Continued)

(52) U.S. Cl.
CPC ............... B29B 11/02 (2013.01); B24B 7/30 (2013.01); B24B 19/005 (2013.01); B24B 19/14 (2013.01);
(Continued)

(58) Field of Classification Search
CPC ... B24B 19/005; B24B 19/14; B24B 27/0608; B24B 27/0625; B24B 11/02;
(Continued)

(56) References Cited

U.S. PATENT DOCUMENTS

2008/0145615 A1* 6/2008 Jacobsen ................. B29C 70/30
428/156
2008/0159871 A1* 7/2008 Bech ....................... F03D 1/065
416/229 R

FOREIGN PATENT DOCUMENTS

FR 2405815 A1 5/1979
GB 2482344 A 2/2012
(Continued)

OTHER PUBLICATIONS

Intellectual Property Office, Search and Examination Report dated Jul. 15, 2014 in Application No. GB1319848.6.
(Continued)

Primary Examiner — Stella K Yi
(74) Attorney, Agent, or Firm — Wood Herron & Evans LLP

(57) ABSTRACT

A method of making a longitudinal reinforcing structure for a wind turbine blade. The method comprises a) providing an elongate master strip (62) of reinforcing material having substantially flat first and second surfaces, the distance between the first and second surfaces defining the thickness of the master strip; and b) dividing the master strip transversely to form a first strip and a shorter master strip, the respective strips being arranged end to end such that a trailing end of the first strip is located adjacent a new leading end of the master strip. The step of dividing the master strip comprises removing material from a dividing region extending through the entire thickness of the master strip, wherein the dividing region is shaped such that a chamfer (19c) at the trailing end (19b) of the first strip is created and a chamfer
(Continued)

(63a) at the new leading end (63) of the master strip is created when the master strip is divided.

25 Claims, 10 Drawing Sheets

(51) Int. Cl.
| | |
|---|---|
| *B24B 19/00* | (2006.01) |
| *B24B 19/14* | (2006.01) |
| *B24B 27/06* | (2006.01) |
| *B29B 11/02* | (2006.01) |
| *B29C 67/00* | (2017.01) |
| *B29C 70/02* | (2006.01) |
| *B29C 70/54* | (2006.01) |
| *B29C 70/84* | (2006.01) |
| *B29D 99/00* | (2010.01) |
| *B29L 31/00* | (2006.01) |
| *B29L 31/08* | (2006.01) |
| *B29K 105/08* | (2006.01) |
| *B29K 307/04* | (2006.01) |

(52) U.S. Cl.
CPC ........ *B24B 27/0608* (2013.01); *B29C 70/021* (2013.01); *B29C 70/545* (2013.01); *B29C 70/84* (2013.01); *B29D 99/0028* (2013.01); *F03D 1/0675* (2013.01); *B29C 67/0044* (2013.01); *B29C 2793/009* (2013.01); *B29K 2105/0872* (2013.01); *B29K 2307/04* (2013.01); *B29L 2031/003* (2013.01); *B29L 2031/085* (2013.01); *Y02E 10/721* (2013.01); *Y02P 70/177* (2015.11); *Y02P 70/523* (2015.11)

(58) Field of Classification Search
CPC ..... B29C 70/021; B29C 70/04; B29C 70/545; B29C 39/30; B29C 43/40; B29C 45/14221; B29C 51/268; B29C 53/8091; B29C 2793/00; B29L 2031/085; Y02P 70/523; B23B 2200/243
See application file for complete search history.

(56) References Cited

FOREIGN PATENT DOCUMENTS

| | | |
|---|---|---|
| GB | 2497578 A | 6/2013 |
| WO | 03057457 A1 | 7/2003 |
| WO | 2006015598 A1 | 2/2006 |
| WO | 2011092486 A1 | 8/2011 |
| WO | WO 2012013192 * | 2/2012 |

OTHER PUBLICATIONS

European Patent Office, International Search Report and Written Opinion dated Feb. 9, 2015 issued in International Patent Application No. PCT/DK2014/050373.

* cited by examiner

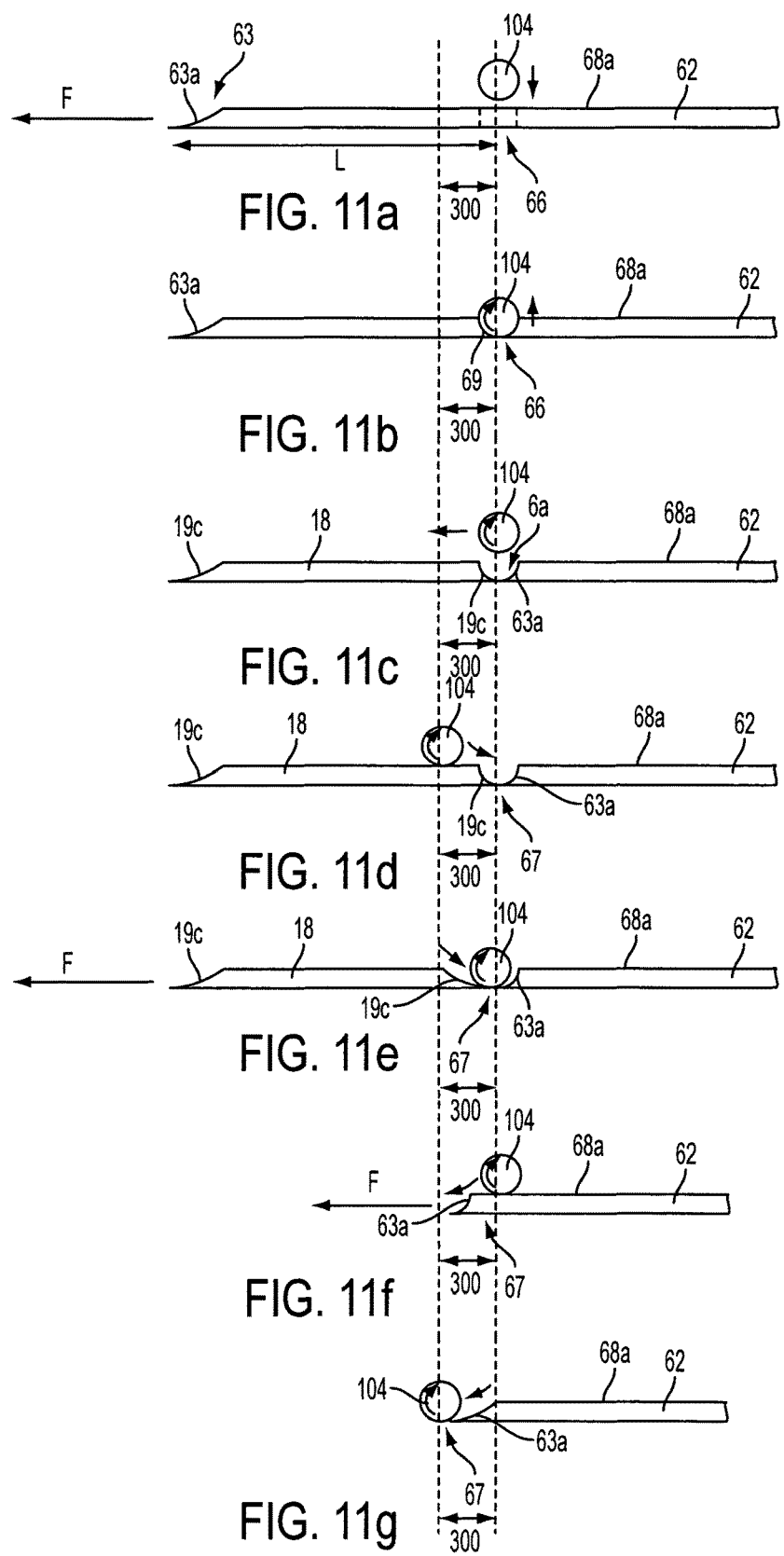

WIND TURBINE BLADES

FIELD OF THE INVENTION

The present invention relates to wind turbine blades and to methods of manufacturing wind turbine blades. More specifically, the present invention relates to wind turbine blades that include a stack of load-bearing reinforcing strips integrated within the structure of the shell.

BACKGROUND TO THE INVENTION

FIG. 1a is a cross-sectional view of a wind turbine rotor blade 10. The blade has an outer shell, which is fabricated from two half shells: a windward shell 11a and a leeward shell 11b. The shells 11a and 11b are moulded from glass-fibre reinforced plastic (GRP). Parts of the outer shell 11 are of sandwich panel construction and comprise a core 12 of lightweight foam (e.g. polyurethane), which is sandwiched between inner 13 and outer 14 GRP layers or 'skins'.

The blade 10 comprises a first pair of spar caps 15a and 15b and a second pair of spar caps 16a, 16b. The respective pairs of spar caps 15a and 15b, 16a and 16b are arranged between sandwich panel regions of the shells 11a and 11b. One spar cap 15a, 16a of each pair is integrated with the windward shell 11a and the other spar cap 15b, 16b of each pair is integrated with the leeward shell 11b. The spar caps of the respective pairs are mutually opposed and extend longitudinally along the length of the blade 10.

A first longitudinally-extending shear web 17a bridges the first pair of spar caps 15a and 15b and a second longitudinally-extending shear web 17b bridges the second pair of spar caps 16a and 16b. The shear webs 17a and 17b in combination with the spar caps 15a and 15b and 16a and 16b form a pair of I-beam structures, which transfer loads effectively from the rotating blade 10 to the hub of the wind turbine. The spar caps 15a and 15b and 16a and 16b in particular transfer tensile and compressive bending loads, whilst the shear webs 17a and 17b transfer shear stresses in the blade 10.

Each spar cap 15a and 15b and 16a and 16b has a substantially rectangular cross section and is made up of a stack of pre-fabricated reinforcing strips 18. The strips 18 are pultruded strips of carbon-fibre reinforced plastic (CFRP), and are substantially flat and of rectangular cross section. The number of strips 18 in the stack depends upon the thickness of the strips 18 and the required thickness of the shells 11a and 11b, but typically the strips 18 each have a thickness of a few millimeters and there may be between three and twelve strips in the stack. The strips 18 have a high tensile strength, and hence have a high load bearing capacity.

FIG. 1b illustrates in perspective view a spar cap 15a in isolation. The strips 18 of the spar cap 15a are of decreasing lengths moving from the lower-most strip 18 to the upper-most strip 18, and the ends 19 of the strips 18 are staggered along the length of the spar cap 15a. Each end 19 is tapered, so as to facilitate stress transfer between strips 18 in the stack and to reduce stress concentrations when the stack is overlaid with materials forming the inner skin 13.

The blade 10 is made using a resin-infusion process as will now be described by way of example with reference to FIGS. 1c and 1d. Referring to FIG. 1c, this shows a mould 20 for a half shell of a wind turbine blade in cross-section. A glass-fibre layer 22 is arranged in the mould 20 to form the outer skin 14 of the blade 10. Three elongate panels 24 of polyurethane foam are arranged on top of the glass-fibre layer 22 to form the sandwich panel cores 12 referred to above. The foam panels 24 are spaced apart relative to one another to define a pair of channels 26 in between. A plurality of pultruded strips 18 of CFRP, as described above with reference to FIG. 1a, are stacked in the respective channels 26. Three strips 18 are shown in each stack in this example, but there may be any number of strips 18 in a stack.

Referring to FIG. 1d, once the strips 18 have been stacked, a second glass-fibre layer 28 is arranged on top of the foam panels 24 and the stacks of pultruded strips 18. The second glass-fibre layer 28 forms the inner skin 13 of the blade 10. Next, vacuum bagging film 30 is placed over the mould 20 to cover the layup. Sealing tape 32 is used to seal the vacuum bagging film 30 to a flange 34 of the mould 20. A vacuum pump 36 is used to withdraw air from the sealed region between the mould 20 and the vacuum bagging film 30, and resin 38 is supplied to the sealed region. The resin 38 infuses between the various laminate layers and fills any gaps in the laminate layup. Once sufficient resin 38 has been supplied to the mould 20, the mould 20 is heated whilst the vacuum is maintained to cure the resin 38 and bond the various layers together to form the half shell of the blade. The other half shell is made according to an identical process. Adhesive is then applied along the leading and trailing edges of the shells and the shells are bonded together to form the complete blade.

The integration of the spar caps 15a and 15b and 16a and 16b within the structure of the outer shells 11a and 11b avoids the need for a separate spar cap such as a reinforcing beam, which is typically bonded to an inner surface of the shell in many conventional wind turbine blades. Other examples of rotor blades having spar caps integral with the shell are described in EP 1 520 983, WO 2006/082479 and UK Patent Application GB 2497578.

The CFRP pultruded strips 18 extend along the majority of the length of the wind turbine blade 10. Modern wind turbine blades may be in excess of eighty meters long, and so it will be appreciated that these strips are very long and heavy. The length and weight of the strips presents challenges relating to the manufacture of the blades, and relating to the handling and transportation of the strips. The present invention aims to address these challenges by providing a convenient method of manufacturing this type of wind turbine blade, and by providing apparatus for use in the method.

SUMMARY OF THE INVENTION

Against this background, and from a first aspect, the invention resides in a method of making a longitudinal reinforcing structure for a wind turbine blade, the method comprising: a) providing an elongate master strip of reinforcing material having substantially flat first and second surfaces, the distance between the first and second surfaces defining the thickness of the master strip; and b) dividing the master strip transversely to form a first strip and a shorter master strip, the respective strips being arranged end to end such that a trailing end of the first strip is located adjacent a new leading end of the master strip, wherein the step of dividing the master strip comprises removing material from a dividing region extending through the entire thickness of the master strip, wherein the dividing region is shaped such that a chamfer at the trailing end of the first strip is created and a chamfer at the new leading end of the master strip is created when the master strip is divided.

The invention therefore provides a method in which a first strip can be divided from a master strip whilst chamfers are simultaneously created at a trailing end of the first strip and a leading end of the master strip. In this way, a single process step can be used to divide and chamfer the strips, which increases the speed of the manufacturing process, and reduces the space required.

The dividing region may taper through the thickness of the master strip moving in a direction from the first surface towards the second surface of the master strip such that a longitudinal extent of the dividing region is narrower at the second surface of the master strip than at the first surface. In this way, the chamfered surface may taper in a similar fashion. A tapered chamfer is particularly advantageous, as it provides particularly effective stress transfer between strips in the longitudinal reinforcing structure.

The method may comprise grinding the master strip to remove material from the dividing region. In particular, the method may comprise moving a grinding device such as a grinding drum through the thickness of the master strip from the first surface of the master strip towards the second surface of the master strip. Grinding the master strip is a quick and inexpensive method of removing material, and causes minimal damage to the strips.

The method may comprise moving the grinding device in a curved path relative to the master strip so as to form curved chamfers at the trailing end of the first strip and at the new leading end of the master strip. Curved chamfers are particularly effective in providing stress transfer between strips in the longitudinal reinforcing structure, and moving the grinding device in a curved path controls the resulting curve of the chamfer, such that the curve can be tailored as required.

The method may comprise further shaping the chamfer at the trailing end of the first strip by removing material from a shaping region of the first strip. Alternatively or additionally, the method may comprise further shaping the chamfer at the new leading end of the master strip by removing material from a shaping region of the master strip. In this way, if a chamfer produced by the initial dividing and chamfering process is not of the required shape, the chamfer can be further shaped until the required shape is achieved.

In embodiments where a grinding device is used, the method may comprise using the grinding device to further shape the chamfers at the trailing end of the first strip and at the new leading end of the master strip. In this way, the same grinding device can be used for the initial dividing and chamfering process, and for the subsequent shaping process, reducing the manufacturing time, and the space required.

To reduce the required space still further, the method may comprise moving the new leading end of the master strip in the feed direction before removing material from the shaping region of the master strip. In this way, the shaping region at the new leading end of the master strip can be moved into the space previously occupied by the shaping region at the trailing end of the first strip, so that the shaping process can take place in the same space. This means that the movement range of the grinding device need only be equal to the length of a single chamfer.

The method may comprise creating a chamfer in a leading end of the first strip. For example, the method may comprise creating a chamfer in a leading end of the master strip before dividing the master strip transversely to form the first strip, and the chamfered leading end of the master strip may become the leading end of the first strip when the master strip is divided.

The method may further comprise feeding the master strip along a feed path in a feed direction towards a dividing station at which the master strip is divided and chamfered. In this way, the dividing and chamfering process may be part of a larger manufacturing process, and the master strip may be fed from earlier processing or storage stations upstream of the dividing and chamfering station.

After the master strip has been divided, the method may further comprise feeding the first strip along the feed path in the first direction away from the dividing station. In this way, the divided first strip may be fed to later processing or storage stations downstream of the dividing and chamfering station.

The method may comprise feeding a first predetermined length of the master strip past a dividing and chamfering device associated with the dividing station such that the dividing region of the master strip is located adjacent the dividing and chamfering device, wherein the first predetermined length is substantially the length of the first strip.

The method may further comprise dividing the master strip transversely to form a second strip, wherein the new chamfered leading end of the master strip becomes a leading end of the second strip and the step of dividing the master strip to form the second strip also serves to create a chamfer at a trailing end of the second strip and a chamfer in an adjacent new leading end of the master strip. Further strips may also be formed in the same manner, such that the master strip is divided into a plurality of strips having chamfered leading and trailing ends.

In this case, the method may comprise feeding a second predetermined length of the master strip past the dividing and chamfering device before dividing the master strip to form the second strip, wherein the second predetermined length is substantially the length of the second strip. The second predetermined length may be substantially equal to the first predetermined length such that the first and second strips are substantially the same length. Alternatively, the first and second predetermined lengths may be different, such that the second strip is shorter than the first strip or vice versa.

The method may comprise successively feeding predetermined lengths of the master strip past the dividing and chamfering apparatus and dividing and chamfering the master strip to form a plurality of strips of substantially the same length or of differing lengths.

The method may further comprise cutting an end region of the or each strip longitudinally thereby to narrow said end so that the strip(s) can be accommodated in a relatively narrow end of a wind turbine blade.

The method may comprising stacking the first strip with one or more similar strips to form the longitudinal reinforcing structure for a wind turbine blade. The strips may be stacked inside a wind turbine blade mould, or the strips may be stacked outside a wind turbine blade mould and the stack of strips may be transferred into the wind turbine blade mould.

The method may further comprise integrating the strips in the stack by means of resin between the adjacent strips.

The invention also extends to a method of making a wind turbine blade, comprising a) providing a plurality of strips made according to the method described above, b) stacking the strips inside a wind turbine blade mould, or stacking the strips outside a wind turbine blade mould and transferring the stack of strips into the wind turbine blade mould, c) arranging other components of a wind turbine blade in the wind turbine blade mould; and d) integrating the components to form the blade.

From another aspect, the invention resides in apparatus for making a longitudinal reinforcing structure for a wind turbine blade, the apparatus comprising: a feed station configured to feed an elongate master strip of reinforcing material along a feed path in a feed direction, and a dividing station located on the feed path downstream from the feed station, the dividing station comprising a dividing and chamfering device. The feed station is configured to feed the master strip past the dividing and chamfering device, and the dividing and chamfering device is configured to divide the master strip transversely into a plurality of shorter strips having chamfered ends.

The invention also extends to a wind turbine blade comprising a longitudinal reinforcing member made according to the method described above or using the apparatus described above, to a wind turbine blade made using the method described above, and to a wind turbine incorporating such wind turbine blades.

BRIEF DESCRIPTION OF THE DRAWINGS

FIGS. 1a to 1d have already been described above by way of background to the invention. In order that embodiments of the invention might be more readily understood, reference will now be made, by way of example only, to the accompanying drawings, in which:

FIGS. 11a to 11g are schematic views of a wind turbine blade being divided and chamfered by the apparatus of FIGS. 3 and 4 according to another alternative method.

DETAILED DESCRIPTION OF EMBODIMENTS OF THE INVENTION

Figure 1A:
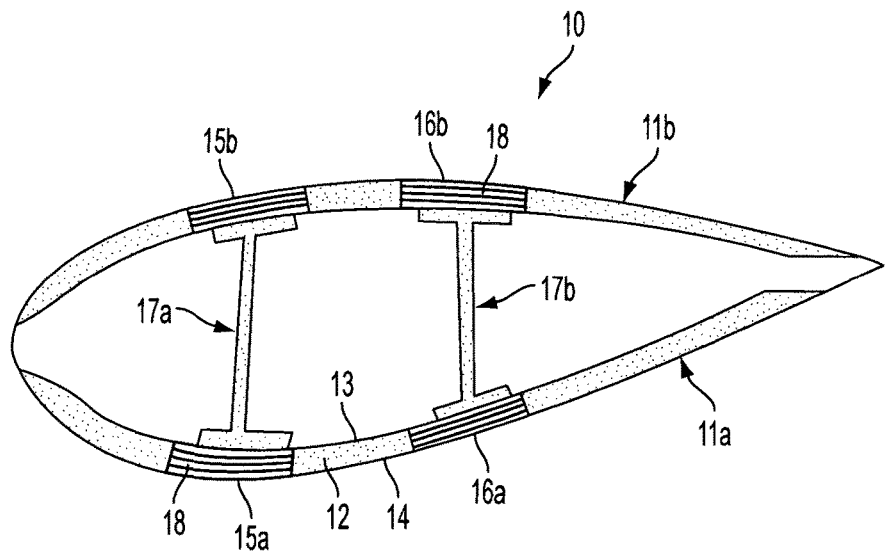
Figure 1B:
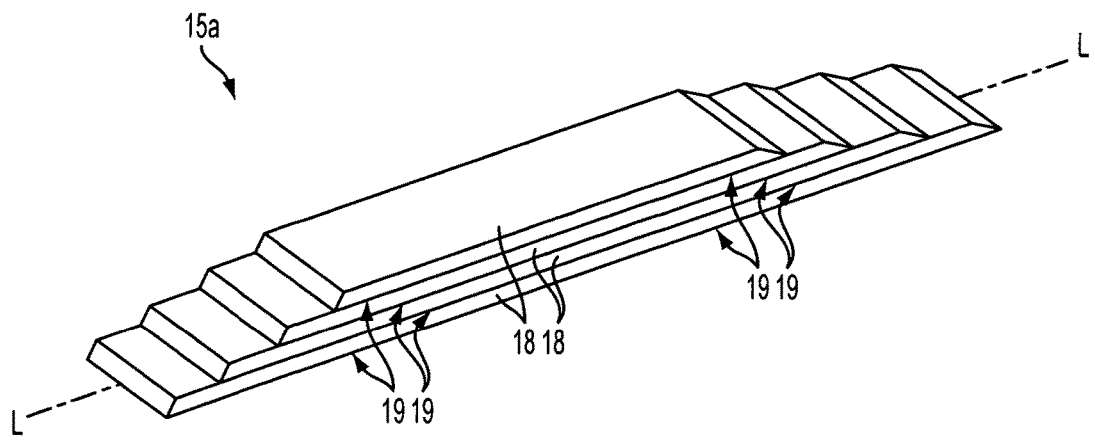
Figure 1C:
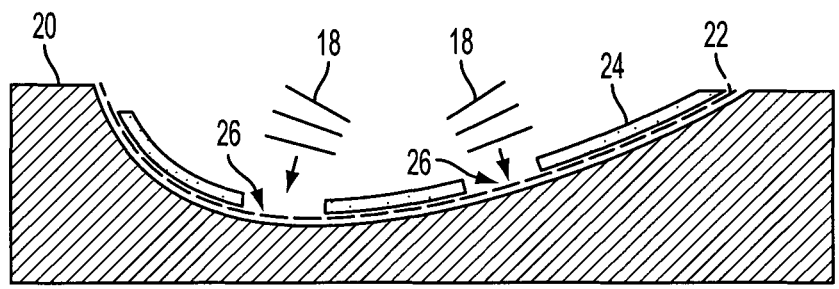
Figure 1D:
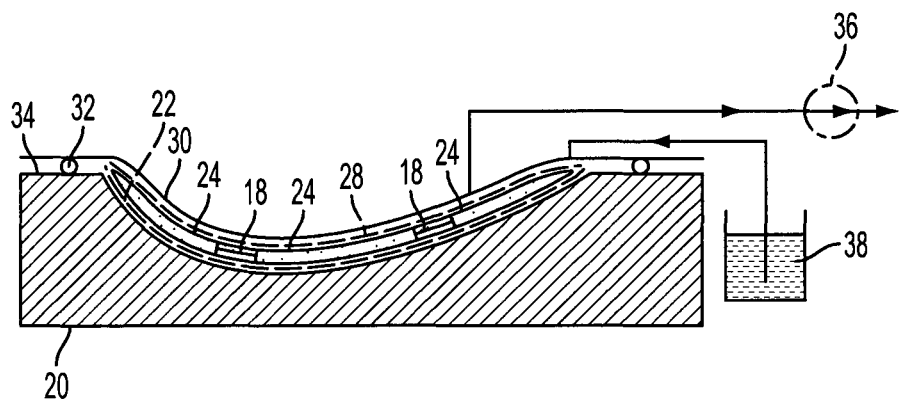
Figure 2:
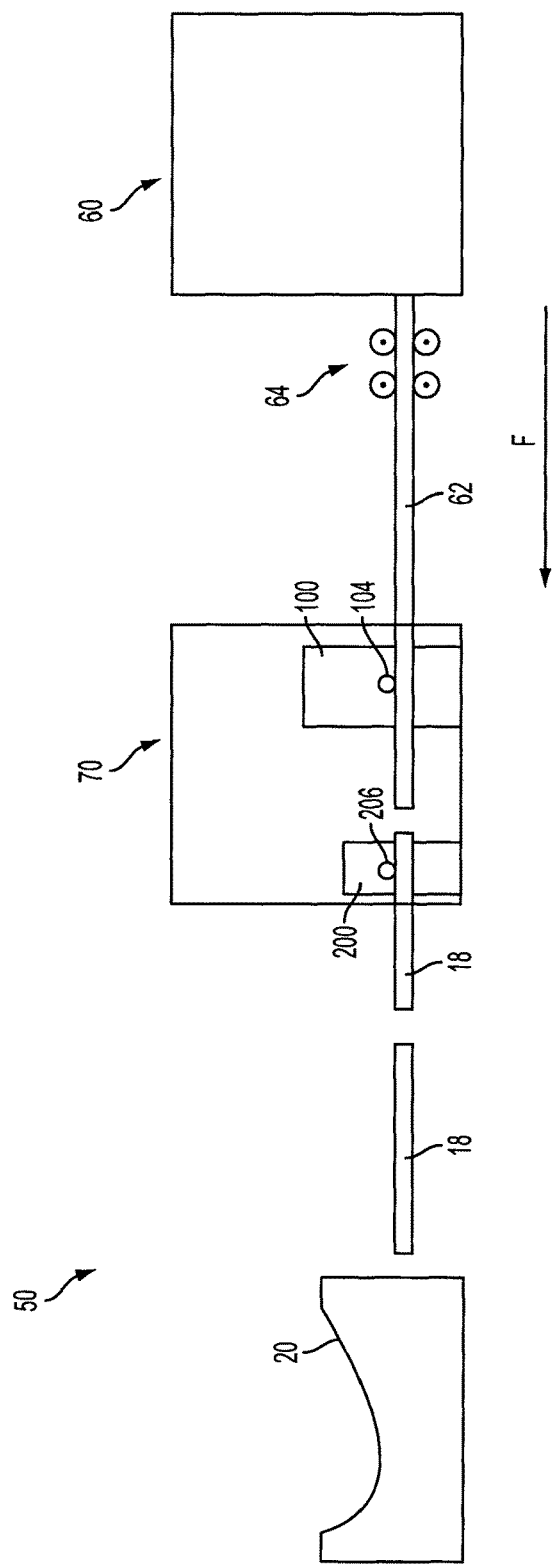
FIG. 2 is a schematic view of manufacturing apparatus including a dividing and chamfering apparatus forming an embodiment of the invention.

FIG. 2 illustrates an apparatus 50 used in the manufacture of wind turbine blades of the type described above by way of introduction to the present invention. More specifically, the apparatus 50 is used for making spar caps comprising a stack of strips of polymeric reinforcing material, as described by way of introduction.

Referring to FIG. 2, the manufacturing apparatus 50 comprises a feed station 60 for dispensing an elongate master strip 62 of polymeric reinforcing material along a path in a feed direction as indicated by the horizontal arrow F in FIG. 2. In this example, the master strip 62 is a pultruded length of carbon-fibre reinforced plastic (CFRP), which is formed into a coil. The master strip 62 has a length several times the length of the spar caps 15a, 15b, 16a, 16b that are to be integrated into the blade 10. For example, the spar caps 15a, 15b, 16a, 16b may have a length of approximately 50 meters, whilst the coiled master strip 62 may have a length of approximately 250 meters or more.

The master strip 62 is fed by a feeding means 64 from the feed station 60 to a dividing station 70 arranged inline with the feed station 60. At the dividing station 70, the master strip 62 is divided into smaller strip sections 18 that form the strips 18 that are subsequently stacked to form the spar caps 15a, 15b, 16a, 16b. Also at the dividing station 70, the strips 18 are shaped so that they can be accommodated in the relatively narrow tip region of the blade. Specifically, the strips 18 are cut in a longitudinal direction such that they become narrower towards one end when viewed in plan view. This process will be described in more detail later. The strips 18 are then fed on to a mould tool, in this case a wind turbine blade mould 20, where the strips 18 are stacked and integrated to form the spar caps 15a, 15b, 16a, 16b.

Figure 5:
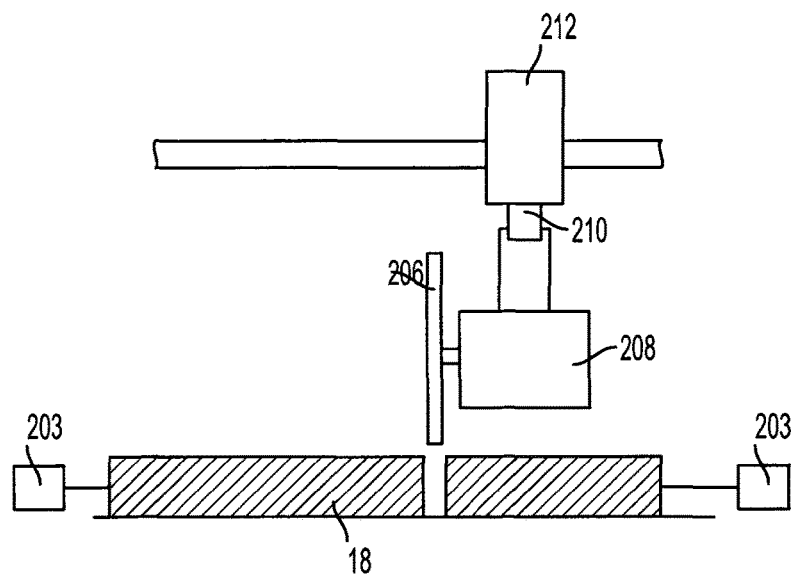
FIG. 5 is a front view of cutting apparatus forming part of the manufacturing apparatus of FIG. 2.
Figure 6:
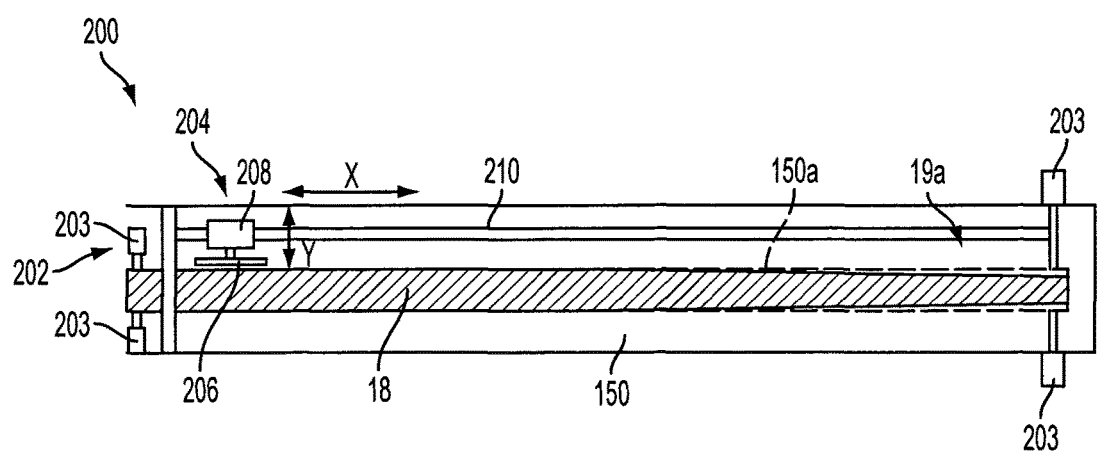
FIG. 6 is a plan view of the cutting apparatus of FIG. 5.

The dividing station 70 will now be described in further detail. The dividing station 70 comprises a dividing and chamfering apparatus 100 and a cutting apparatus 200 for narrowing the ends of the strips. The dividing and chamfering apparatus 100 is arranged in an up-stream position (i.e. towards the feed station 60) and is shown in more detail in FIGS. 3 and 4, whilst the cutting apparatus 200 is arranged in a down-stream position (i.e. towards the wind turbine mould 20), and is shown in FIGS. 5 and 6. Feeding means, such as driven conveyors (not shown) feed the master strip 62 in to the dividing and chamfering apparatus 100, then feed the divided strips 18 from the dividing and chamfering apparatus 100 to the cutting apparatus 200, and finally feed the cut strips 18 onwards towards the blade mould 20.

Figure 3:
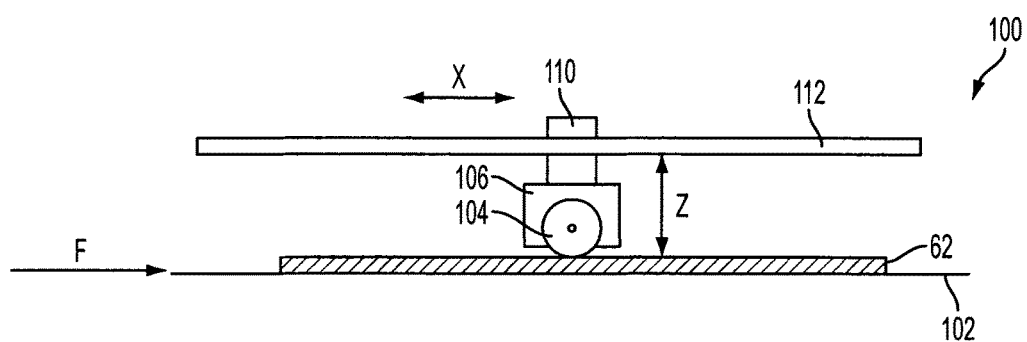
FIG. 3 is a side view of the dividing and chamfering apparatus of FIG. 2.
Figure 4:
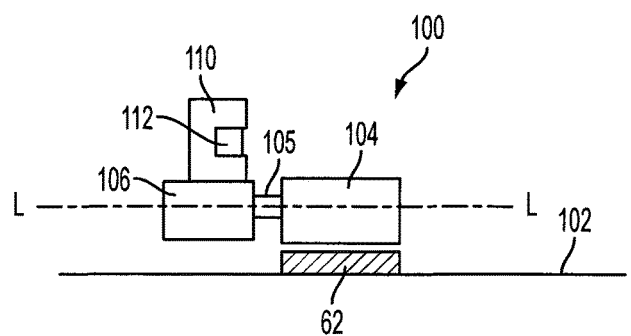
FIG. 4 is a front view of the dividing and chamfering apparatus of FIG. 3.

FIG. 3 is a side view of the dividing and chamfering apparatus 100 whilst FIG. 4 is an end view of the apparatus 100, i.e. as viewed along the feed direction F. Referring to these figures, the dividing and chamfering apparatus 100 comprises a platform 102 for supporting the master strip 62 during the dividing process. A dividing and chamfering device in the form of a grinding drum 104 is arranged above the platform 102. The grinding drum 104 has a diameter of approximately 150 mm, and is rotatable on a drive shaft 105 (FIG. 4) about a longitudinal axis L perpendicular to the feed direction F, indicated on FIG. 4. Rotation of the grinding drum 104 is driven by a drive motor 106 that is coupled to the grinding drum 104 by the drive shaft 105.

The grinding drum 104, drive motor 106 and drive shaft 105 are mounted on a carriage 110. The carriage 110 is slidably mounted on a rail 112, so that the grinding drum 104 can be displaced back and forth along a direction X indicated on FIG. 3, which is substantially parallel to the feed direction. The rail 112 is also movable upwardly and downwardly, towards and away from the master strip 62, such that the grinding drum 104 can be displaced towards and away from the master strip 62 along a direction Z indicated on FIG. 3, i.e. perpendicular to the feed direction F. Rotation of the grinding drum 104, and movement of the grinding drum 104 in the X and Z directions, is controlled by means of a feedback system such as one or more servomechanisms.

The grinding drum 104, rail 112, parts of the drive system 108 and a region of the master strip 62 that is close to the grinding drum 104, are shielded by a casing (not shown in the Figures). The casing prevents access to the grinding drum 104 and other moving parts of the apparatus 100 when they are in use, for safety reasons.

Downstream of the dividing and chamfering apparatus 100 is a platform 150, visible in FIG. 6, that supports the strip 18 as it is moved away from the dividing and chamfering station 100 and towards the cutting apparatus 200.

Referring to FIGS. 5 and 6, the cutting apparatus 200 sits over the end region 150a of the platform 150 to cut the corresponding end region 19 of the strip 18, i.e. to narrow the end region 19 so that it may be accommodated within the narrow tip region of the blade.

The cutting apparatus 200 comprises a series of clamping mechanisms 202 comprising hydraulic clamps 203. The clamps 203 hold the strip 18 in place on the platform 150 during the cutting process. A cutting mechanism 204 is arranged above the platform 150. The cutting mechanism 204 comprises a circular saw 206, in this case a diamond saw, that can be rotated to cut a strip 18 supported on the platform 150. Rotation of the circular saw 206 is controlled by a motor 208.

The cutting mechanism 204 is mounted on a rail 210 (FIG. 6) that extends longitudinally in the feed direction F, so that the circular saw 206 can be moved longitudinally back and forth in the direction X indicated on FIG. 6. The rail 210, and hence the circular saw 206, is movable back and forth across the width of the strip 18 in a transverse direction Y, which is perpendicular to the X and Z directions described earlier. Movement of the circular saw in the X and Y directions is controlled by means of a feedback system such as one or more servomechanisms 212.

Use of the dividing and chamfering apparatus 100 and the cutting apparatus 200 in dividing, chamfering, and cutting the strips 18 will now be described.

Referring again to FIG. 2, in use, the master strip 62 is fed from the feed station 60 along the feed path in the feed direction F towards the dividing and chamfering apparatus 100. The dividing and chamfering apparatus 100 receives the master strip 62 and, as will be described in further detail below, the grinding drum 104 is initially used to create a chamfer in a leading end 63 of the master strip 62 and is subsequently used to divide the master strip 62 into a series of strips 18 each having chamfered leading and trailing ends 19a, 19b. It should be noted that the terms 'leading' and 'trailing' are used in this context to denote the relative positions of the respective ends 19a, 19b of the strips 18 along the feed direction F, and should not be confused with the terms 'leading' and 'trailing' when used to describe the edges of a wind turbine blade.

Figure 7A:
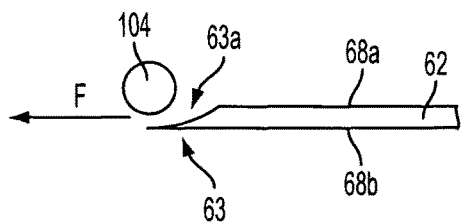
FIGS. 7a to 7e are schematic views of a strip for a spar cap of a wind turbine blade being divided and chamfered by the apparatus of FIGS. 3 and 4.

The dividing and chamfering process will now be described in detail with reference to FIGS. 7a to 7e. Referring first to FIG. 7a, the master strip 62 is fed along the feed path F in the feed direction towards the grinding drum 104. Once the leading end 63 of the master strip 62 is located below the drum, the feed process is halted. The grinding drum 104 is then moved in the Z and X directions to define an arcuate path. The drum 104 is moved back and forth across the end of the master strip 62 along the arcuate path and is moved progressively deeper through the thickness of the master strip 62 to create a curved chamfered end surface 63a in the leading end 63 of the master strip 62.

The path of the grinding drum 104 is controlled by the servomechanisms. In this case, the grinding drum 104 is moved along a substantially parabolic path to create a substantially parabolic chamfered end surface 63a in the master strip 62.

Figure 7B:
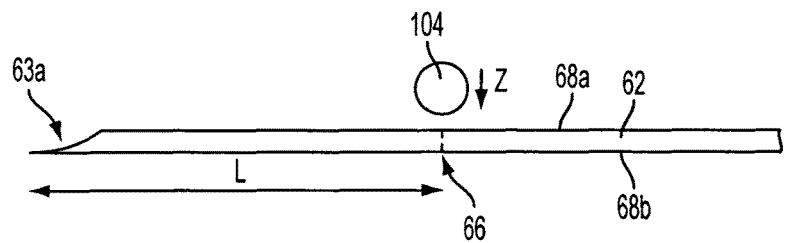

Once the initial chamfered surface 63a has been created in the leading end 63 of the master strip 62, the feed process is continued and the master strip 62 is advanced in the feed direction F. Referring now to FIG. 7b, a predetermined length L of the strip 62 is fed past the grinding drum 104 and the feed process is suspended once again. The predetermined length corresponds substantially to the desired length of the strip 18 to be divided out from the master strip 62.

Once the predetermined length L of the master strip 62 has been fed past the grinding drum 104 and the feed process suspended, a dividing region 66 of the master strip 62 is then located beneath the grinding drum 104. The master strip 62 will be divided and chamfered by removing material from the dividing region 66.

Figure 8:
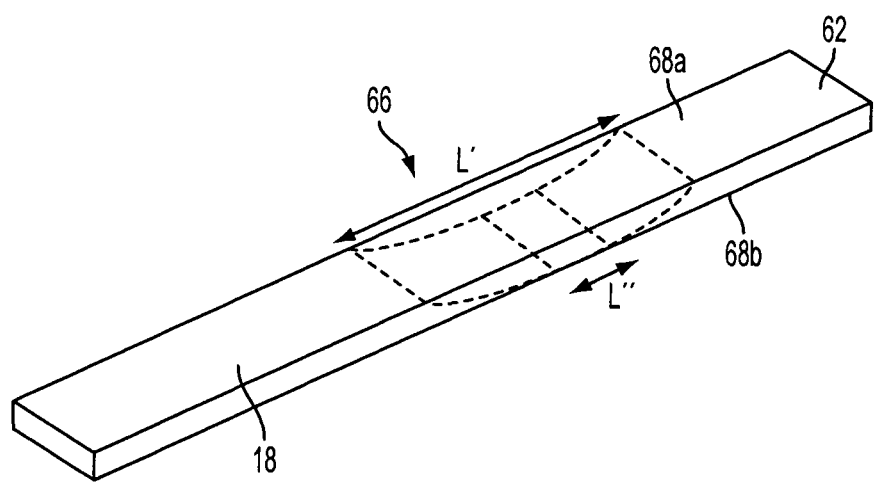
FIG. 8 is a perspective view of a dividing region forming part of the strip of FIGS. 7a to 7e.

The dividing region 66 is shown in detail in FIG. 8. The dividing region 66 tapers from an upper surface 68a of the master strip 62 to a lower surface 68b of the master strip 62. In this way, at the upper surface 68a of the master strip 62, the dividing region 66 has a longitudinal extent L' which is approximately 1 m, while at the lower surface 68b of the master strip 62, the dividing region 66 has a longitudinal extent L" which is less than the longitudinal extent L', and which, in this case, is approximately 25 mm. It will therefore be appreciated that the taper of the dividing region 66, and hence the chamfers 18a, 18b created at the ends 19 of the strip 18 may be relatively shallow in practice, and may be more shallow than they appear in the accompanying figures.

Once located in place, the master strip 62 is ready to be divided.

Figure 7C:
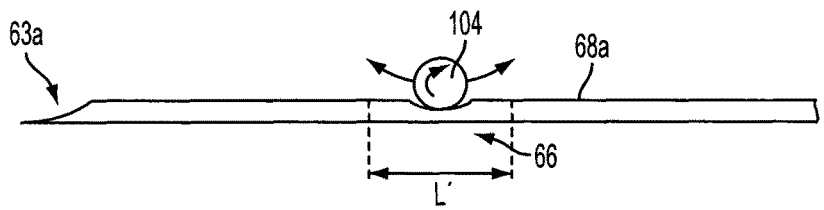

The grinding drum 104 is rotated and is moved downwardly in the Z direction towards an upper surface 68a of the master strip 62 to begin grinding, as shown in FIG. 7b. As material is ground away from the dividing region 66 of the master strip 62, the drum 104 is moved back and forth along a parabolic path, as indicated in FIG. 7c. The parabolic path shapes a ground surface 69 in the master strip 62.

Figure 7D:
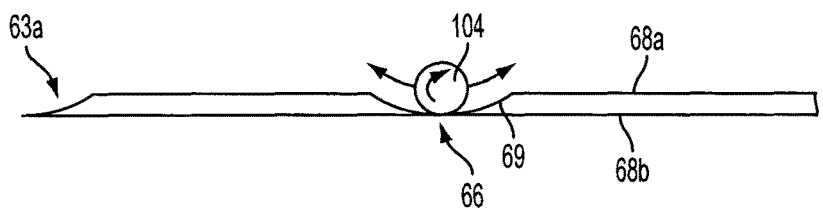
Figure 7E:
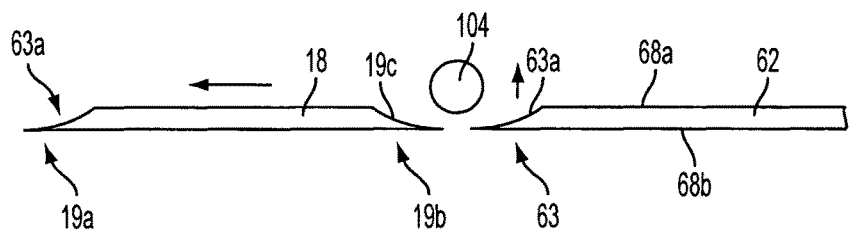

As grinding continues, the grinding drum 104 is moved downwardly in the Z direction to grind deeper into the master strip 62, as shown in FIG. 7d. Eventually, the grinding drum 104 grinds through the entire thickness of the strip. Referring to FIG. 7e, this process creates a first strip 18 having a chamfered leading end 19a, and a chamfered trailing end 19b.

Referring still to FIG. 7e, it will be appreciated that the dividing and chamfering process described above also simultaneously creates a chamfered surface 63a at a new leading end 63 of the remaining length of the master strip 62. The process then essentially repeats, and a subsequent predetermined length of the new master strip 62 is fed past the grinding drum 104 and the grinding drum 104 is then used to divide the master strip 62 to create a second strip 18. The second strip 18 already has a chamfered leading end 19a due to the dividing and chamfering process described above that creates the first strip 18. The subsequent dividing and chamfering process creates a chamfered end surface 19c at the trailing end 19b of the second strip 18 and again at the leading end 63 of the remaining length of the master strip 62. The process continues in this manner to create a succession of strips 18 each having chamfered leading and trailing ends 19a, 19b until the master strip 62 has been depleted.

As the dividing region 66 (FIG. 7c) is approximately 1 meter in length, it will be appreciated that in this example each chamfered surface 19c, 63a extends around 50 cm into the strip 18.

In the dividing and chamfering process described above, the individual strips 18 are divided from the master strip 62 at the shallowest point of the parabolic curve of the ground surface 69. This is particularly advantageous as it means that the strips 18 decrease to zero thickness at their ends. This zero thickness is particularly effective in ensuring stress transfer between the stacked strips 18 in the finished spar cap 15a, 15b, 16a, 16b.

Once each strip 18 has been divided and chamfered, the strip 18 is fed along the platform 150 to the cutting apparatus 200 of FIGS. 5 and 6 where the longitudinal edges of a leading end 19a of the strip 18 are cut in order to narrow the end portion so that the strip 18 can be accommodated in the relatively narrow tip region of the blade. The strip 18 is arranged in the required position on the platform 150 alongside a first longitudinal edge of the strip 18, and the clamps 203 are activated to fix the strip 18 in place. The circular saw 206 is rotated by the motor 208 and is moved steadily in the X direction to cut the strip. As the circular saw 206 is moved in the X direction it is also moved in the Y direction, towards a centre of the strip 18. Movement of the circular saw 206 is controlled by the servo mechanisms 212.

Once the first angled cut has been made, the circular saw 206 is then moved in the Y direction and positioned alongside the second longitudinal edge of the strip 18. The circular saw 206 is then moved back in the X direction to cut the second longitudinal edge on a return pass. Alternatively, the circular saw 206 may first be moved backward in the X direction to its initial position, then moved in the Y direction towards the second longitudinal edge of the strip and finally forward in the X direction to cut the second edge on a second forward pass.

Figure 9:
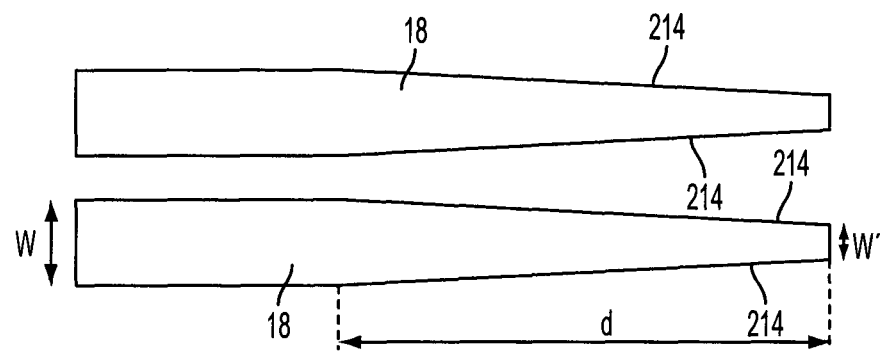
FIG. 9 is a plan view of a pair of strips for a respective pair of spar caps, which have been tapered longitudinally by the cutting apparatus of FIGS. 5 and 6.

FIG. 9 illustrates a typical shape of the end region 19a of the strip 18 after cutting. At the trailing end 19b of the strip 18, the strip 18 has a width w of approximately 200 mm. At the leading end of the strip 18, the strip 18 has a width w' of approximately 75 mm. In this example, the narrowed part of the strip 18 comprises approximately the final 3.5 m section of the strip 18, as indicated by the arrow d in FIG. 9.

After the cutting process has been completed, the clamps 203 are removed, and the strip 18 is fed onwards towards the blade mould 20 for stacking and integration into the wind turbine blade 10.

In this way, the apparatus 50 described provides a simple, mechanised method of processing an elongate master strip 62 into a plurality of smaller strips 18 to make an elongate reinforcing structure such as a spar cap 15a, 15b, 16a, 16b. In particular, the strips 18 can be simultaneously divided and chamfered by virtue of the dividing and chamfering apparatus 100, and separate dividing and chamfering stages are not required. Furthermore, two strip ends can be chamfered simultaneously.

Figure 10A:
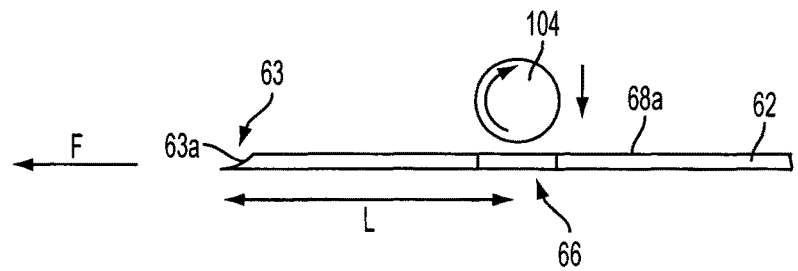
FIGS. 10a to 10d are schematic views of a wind turbine blade being divided and chamfered by the apparatus of FIGS. 3 and 4 according to an another dividing and chamfering method.

FIGS. 10a to 10d illustrate an alternative dividing and chamfering process. In this process, the first chamfered surface 63a is formed in the leading end 63 of the master strip 62 as has already been described. Referring to FIG. 10a, the master strip 62 is then advanced in the feed direction F until a predetermined length L of the strip 62 has been fed past the grinding drum 104 and the feed process is suspended. The predetermined length corresponds substantially to the desired length of the strip 18 to be divided out from the master strip 62.

Once the predetermined length L of the master strip 62 has been fed past the grinding drum 104 and the feed process has been suspended, the dividing region 66 of the master strip 62 is located beneath the grinding drum 104. To divide and chamfer the master strip 62, the grinding drum 104 is rotated and is moved downwardly in the Z direction towards the upper surface 68a of the master strip 62 to begin grinding material away from the dividing region 66.

Figure 10B:
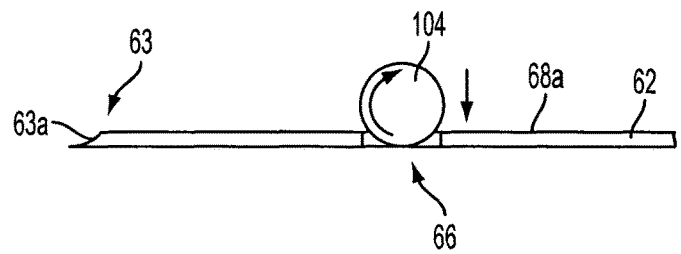

As grinding continues, the grinding drum 104 is moved further downward in the Z direction to grind deeper into the master strip 62, as shown in FIG. 10b. Eventually, the grinding drum 104 grinds through the entire thickness of the master strip 62.

Figure 10C:
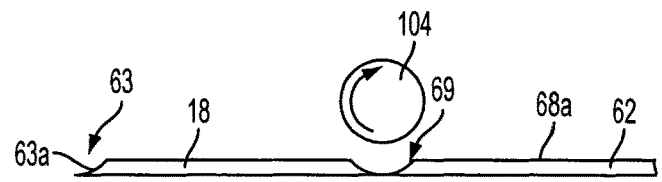

In this process, the drum 104 moves only downwardly in the Z direction, and is not moved back and forth in the X direction during the dividing and chamfering process. In this way, and as seen in FIG. 10c, the curved surface of the drum 104 shapes the ground surface 69 of the master strip 62 to form the chamfered end surfaces 19c, 63a. The shapes of the chamfered end surfaces 19c, 63a are therefore complementary to the shape of the drum 104.

Figure 10D:
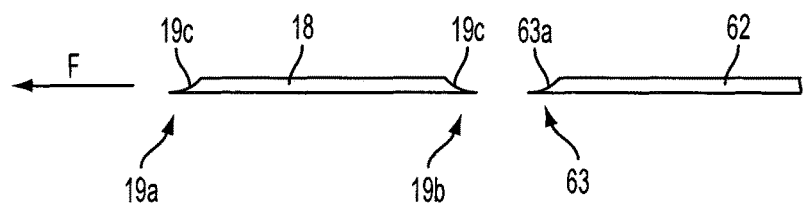

Referring now to FIG. 10d, because the grinding is continued until the drum 104 has ground all the way through the master strip 62, the process divides the master strip 62 so as to create a first strip 18 having a chamfered leading end 19a, and a chamfered trailing end 19b. The dividing and chamfering process described above also simultaneously creates a chamfer 63a at a new leading end 63 of the remaining length of the master strip 62.

Once the strip 18 has been formed, the process then repeats and the grinding drum 104 is used to divide and chamfer the master strip 62 again to create a second strip 18 having a chamfered leading end 19a, and a chamfered trailing end 19b, and to create a chamfered surface 63a at the leading end 63 of the remaining length of the master strip 62. The process continues in this manner to create a succession of strips 18 each having chamfered leading and trailing ends 19a, 19b until the master strip 62 has been depleted. The strips 18 may then be fed onwards for cutting in the manner already described.

FIGS. 11a to 11g illustrate another dividing and chamfering process. The initial stages of this process, shown in FIGS. 11a to 11c, are similar to the stages described in relation to FIGS. 10a to 10c. As shown in FIG. 11a, a dividing region 66 of the master strip 62 is firstly located beneath the grinding drum 104. The drum 104 is lowered towards the upper surface 68a of the master strip 62 to remove material from the dividing region 66 as shown in FIG. 11b. Grinding continues until the drum 104 has ground all the way through the master strip 62 as shown in FIG. 11c. The drum 104 does not move in the X direction at this stage, but moves only downwardly in the Z direction. The curved surface of the drum 104 shapes the ground surface 69 in the master strip 62 to form the chamfered end surface 19c in the trailing end 19b of the divided strip 18 and the chamfered end surface 63a in the leading end 63 of the remaining master strip 62, as has been described.

This process differs from the process illustrated in FIGS. 10a to 10d in that once the master strip 62 has been divided, the chamfered end surface 19c at the trailing end 19b of the strip 18 and the chamfered end surface 63a at the leading end 63 of the remaining master strip 62 are shaped further so as to make the chamfers at the chamfered end surfaces 19b, 63 more shallow.

Figure 12:
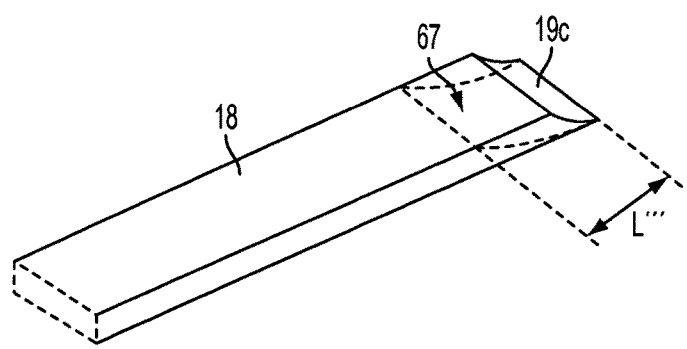
FIG. 12 is a perspective view of a shaping region forming part of the strip of FIGS. 11a to 11g.

The chamfered end surfaces 19c, 63a are shaped by using the grinding drum 104 to remove material from a shaping region 67 that incorporates the respective chamfered end surfaces 19c, 63a. The shaping region 67 in the vicinity of the chamfered end surface 19c of the divided strip 18 is shown in detail in FIG. 12. The shaping region 67 tapers from an upper surface of the strip 18 to a lower surface of the strip 18 to define a taper that is shallower than the taper of the chamfered end surface 19c. At the upper surface of the strip 18, the shaping region 67 has a longitudinal extent L''' which is approximately 0.5 m.

The chamfered end surfaces 19c, 63a are shaped one-at-a-time to create relatively shallow chamfers at the ends of the strips 18, 62, as will now be described.

First, the chamfered end surface 19c at the trailing end 19b of the strip 18 is shaped by removing material from a shaping region 67 near the chamfered end surface 19c. The divided strip 18 and master strip 62 remain in place. The drum 104 is displaced in the X direction towards one end of the shaping region 67, to a left-most position as shown in FIG. 11d. The drum 104 is moved back and forth along an arcuate path that ends at the opposite end of the shaping region 67, with the drum 104 in its right-most position, as shown in FIG. 11e. The shape of the arcuate path defines the material that is removed from the shaping region 67, and hence defines the final shape of the chamfered end surface 19c of the divided strip 18.

Once the chamfered end surface 19c of the divided strip 18 has been shaped to create a relatively shallow chamfer, the divided strip 18 is moved onwards in the feed direction F for further processing.

Next, the chamfered end surface 63a at the leading end 63 of the remaining master strip 62 is shaped by removing material from a shaping region 67 near that chamfered end surface 63a.

Referring to FIG. 11f, the remaining master strip 62 is fed in the feed direction F, so that a shaping region 67 of the remaining master strip 62 is located beneath the grinding drum 104. The grinding drum 104 is positioned at one end of the shaping region 67 in its right-most position as shown in FIG. 11f. The drum 104 is then rotated and lowered onto the upper surface 68a of the master strip 62. The drum 104 is moved along an arcuate path that ends at the opposite end of the shaping region 67, with the drum 104 in its left-most position, as shown in FIG. 11g, so as to shape the chamfered end surface 63a of the master strip 62 to create a relatively shallow chamfer.

As indicated by the dashed lines in FIGS. 11a to 11g, the distance 300 between the left-most position of the drum 104 (illustrated in FIGS. 11d and 11g) and the right-most position of the drum 104 (illustrated in FIGS. 11e and 11f) need only be equal to the length of a single chamfered surface 19c, 63a, which in this example is approximately 0.5 m. It will be appreciated that reducing the movement of the drum 104 to a distance that is equal to the length of a single chamfered surface, rather than the length of two chamfered surfaces, represents a significant saving in the space required by the dividing and chamfering apparatus, particularly if even shallower chamfers are required.

Once the chamfered end surface 63a of the master strip 62 has been shaped as required, the dividing, chamfering and further shaping process can be repeated to produce more divided strips 18.

In the embodiments where the grinding drum is moved in the X direction as well as the Z direction, the drum need not be moved in an arcuate motion to form a parabolic chamfered surface, but may be moved in any manner to grind a chamfered surface of any shape.

In embodiments where the chamfered end surfaces are further shaped after an initial dividing and chamfering process, the drum may be moved in any suitable manner to further shape the end surfaces. For example, the drum may begin in an upper position, such that it is moved downwardly from the upper surface of the strip to the lower surface of the strip, as has been described with reference to FIGS. 11d to 11g, or the drum may begin in a lower position, such that it is moved upwardly from the lower surface of the strip to the upper surface of the strip. The drum may also begin in an intermediate position. In preferred embodiments, the drum is moved back-and-forth along the arcuate path with pressure applied to the strip in the Z direction.

Other embodiments of the invention are envisaged that are similar to the embodiment illustrated in FIGS. 11a to 11g, but in which the steps illustrated in FIGS. 11a to 11c are omitted. In this embodiment, the dividing and chamfering process begins with grinding drum being moved in the arcuate motion illustrated in FIGS. 11d and 11e, such that the grinding drum forms a shallow chamfer in the trailing end of the first strip whilst simultaneously dividing the first strip from the master strip, and forming a steep chamfer in the leading end of the master strip. The steep chamfer formed in the leading end of the master strip may then be shaped further as illustrated in FIGS. 11f and 11g.

The master strip need not be divided and chamfered by grinding, but may be divided and chamfered by any other suitable means, such as, for example, laser cutting. Thus, the dividing and chamfering device need not be a grinding drum, but may be any suitable device, such as a laser.

Additional processing stages may be added at any stage of the manufacturing process. If the cutting stage is not required, the cutting process may be omitted.

The strips need not be fed directly to the mould tooling after processing, but may be fed for example to further processing areas, or to a storage area. The mould tooling need not be a blade mould, but may be a mould suitable for forming spar caps separately, for later integration into wind turbine blades.

The invention claimed is:

1. A method of making a longitudinal reinforcing structure for a wind turbine blade, the method comprising:
   a. providing an elongate master strip of reinforcing material having substantially flat first and second surfaces, the distance between the first and second surfaces defining the thickness of the master strip; and
   b. dividing the master strip transversely to form a first strip and a shorter master strip, the respective strips being arranged end to end such that a trailing end of the first strip is located adjacent a new leading end of the master strip;
   wherein the elongate master strip of reinforcing material includes a pultruded length of carbon-fiber reinforced plastic, and
   wherein the step of dividing the master strip comprises removing material from a dividing region extending through the entire thickness of the master strip, wherein the dividing region is shaped such that a chamfer at the trailing end of the first strip is created and/or a chamfer at the new leading end of the master strip is created when the master strip is divided.

2. The method of claim 1, wherein the dividing region tapers through the thickness of the master strip moving in a direction from the first surface towards the second surface of the master strip such that a longitudinal extent of the dividing region is narrower at the second surface of the master strip than at the first surface.

3. The method of claim 1, comprising grinding the master strip to remove material from the dividing region.

4. The method of claim 3, comprising moving a grinding device such as a grinding drum through the thickness of the master strip from the first surface of the master strip towards the second surface of the master strip.

5. The method of claim 4, comprising moving the grinding device in a curved path relative to the master strip so as to form curved chamfers at the trailing end of the first strip and/or at the new leading end of the master strip.

6. The method of claim 1, comprising further shaping the chamfer at the trailing end of the first strip by removing material from a shaping region of the first strip.

7. The method of claim 6, comprising further shaping the chamfer at the new leading end of the master strip by removing material from a shaping region of the master strip.

8. The method of claim 7, comprising using the grinding device to further shape the chamfers at the trailing end of the first strip and at the new leading end of the master strip.

9. The method of claim 7, comprising moving the new leading end of the master strip in a feed direction before removing material from the shaping region of the master strip.

10. The method of claim 1, further comprising creating a chamfer in a leading end of the first strip.

11. The method of claim 10, further comprising creating a chamfer in a leading end of the master strip before dividing the master strip transversely to form the first strip, wherein the chamfered leading end of the master strip becomes the leading end of the first strip when the master strip is divided.

12. The method of claim 1, further comprising feeding the master strip along a feed path in a feed direction towards a dividing station at which the master strip is divided and chamfered.

13. The method of claim 12, wherein the grinding device travels over a longitudinal extent in the feed direction, the longitudinal extent being substantially equal to the length of the chamfer at the trailing end of the first strip and/or the length of the chamfer at the new leading end of the master strip.

14. The method of claim 12, wherein after the master strip has been divided, the method further comprises feeding the first strip along the feed path in the first direction away from the dividing station.

15. The method of claim 12, comprising feeding a first predetermined length of the master strip past a dividing and chamfering device associated with the dividing station such that the dividing region of the master strip is located adjacent the dividing and chamfering device, wherein the first predetermined length is substantially the length of the first strip.

16. The method of claim 1, further comprising dividing the master strip transversely to form a second strip, wherein the new chamfered leading end of the master strip becomes a leading end of the second strip and the step of dividing the master strip to form the second strip also serves to create a chamfer at a trailing end of the second strip and a chamfer in an adjacent new leading end of the master strip.

17. The method of claim 16, further comprising feeding a second predetermined length of the master strip past the dividing and chamfering device before dividing the master strip to form the second strip, wherein the second predetermined length is substantially the length of the second strip.

18. The method of claim 17, wherein the second predetermined length is substantially equal to the first predetermined length such that the first and second strips are substantially the same length.

19. The method of claim 17, wherein the first and second predetermined lengths are different such that the second strip is shorter than the first strip or vice versa.

20. The method of claim 17, comprising successively feeding predetermined lengths of the master strip past the dividing and chamfering apparatus and dividing and chamfering the master strip to form a plurality of strips of substantially the same length or of differing lengths.

21. The method of claim 1, further comprising cutting an end region of the or each strip longitudinally thereby to narrow said end so that the strip(s) can be accommodated in a relatively narrow end of a wind turbine blade.

22. The method of claim 1, further comprising stacking the first strip with one or more similar strips to form the longitudinal reinforcing structure for a wind turbine blade.

23. The method of claim 22, wherein the method further comprises stacking the strips inside a wind turbine blade mould, or stacking the strips outside a wind turbine blade mould and transferring the stack of strips into the wind turbine blade mould.

24. The method of claim 22, further comprising integrating the strips in the stack by means of resin between the adjacent strips.

25. A method of making a wind turbine blade comprising:
 a) providing a plurality of strips made according to the method of claim 1;
 b) stacking the strips inside a wind turbine blade mould, or stacking the strips outside a wind turbine blade mould and transferring the stack of strips into the wind turbine blade mould;
 c) arranging other components of a wind turbine blade in the wind turbine blade mould; and
 d) integrating the components to form the blade.

* * * * *